United States Patent [19]

Wakaizumi

[11] Patent Number: 4,654,725
[45] Date of Patent: Mar. 31, 1987

[54] INDEX SIGNAL ISSUE MECHANISM OF A MAGNETIC RECORD AND REPRODUCTION DEVICE

[75] Inventor: Kiyoshi Wakaizumi, Tokyo, Japan

[73] Assignee: Janome Sewing Machine Co., Ltd., Tokyo, Japan

[21] Appl. No.: 708,337

[22] Filed: Mar. 5, 1985

[30] Foreign Application Priority Data

Jul. 6, 1984 [JP] Japan ............................ 59-101250[U]

[51] Int. Cl.⁴ ........................ G11B 5/016; G11B 17/02
[52] U.S. Cl. ........................................... 360/97; 360/99
[58] Field of Search ....................................... 360/97–99

[56] References Cited

U.S. PATENT DOCUMENTS 4,445,157  4/1984  Takahashi ............................ 360/99
4,485,464  11/1984 Shimaoka ............................ 360/97

Primary Examiner—Robert S. Tupper
Attorney, Agent, or Firm—Michael J. Striker

[57] ABSTRACT

An index signal issue mechanism of a magnetic record and reproducing device has a magnetic disc, a spindle hub which chuck and rotates the magnetic disc and has a lower surface, a driving pin arranged on the spindle hub and engaging the spindle hub, a support spring secured to said lower surface of said spindle hub and supporting said driving pin, a reflection plate extending to said support spring, and a photo sensor arranged opposite to said reflection plate.

1 Claim, 4 Drawing Figures

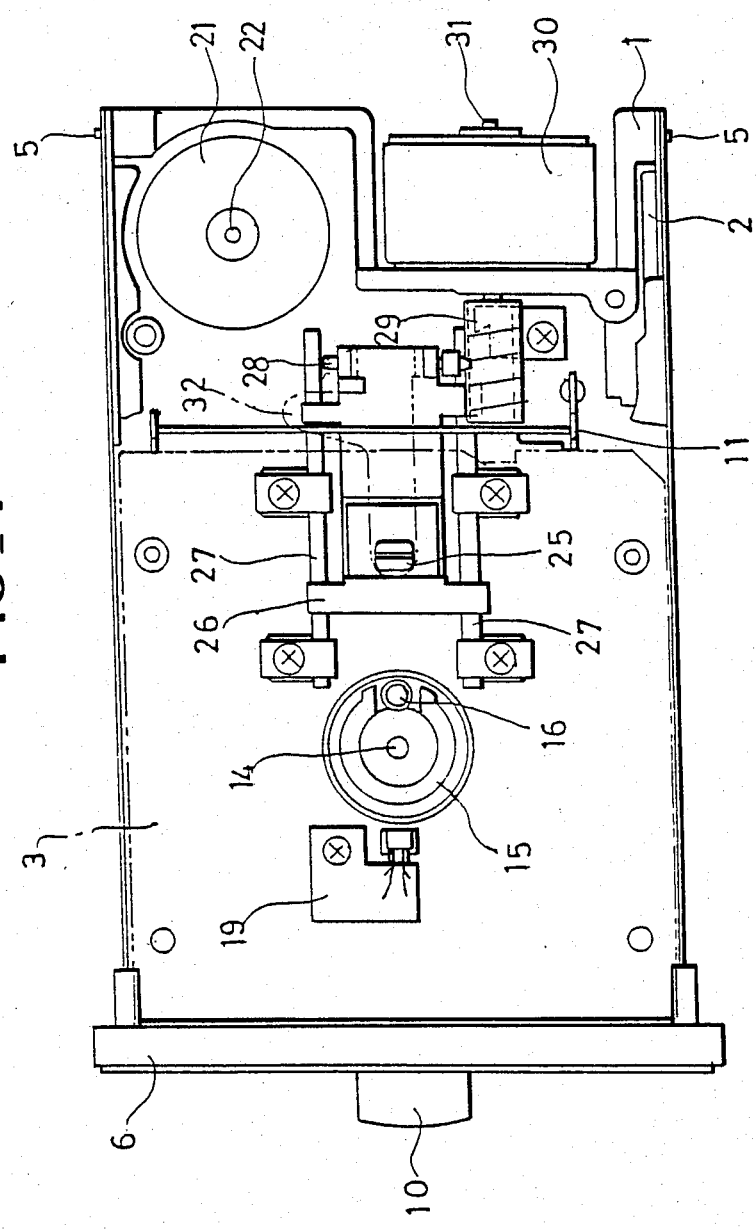
FIG_1

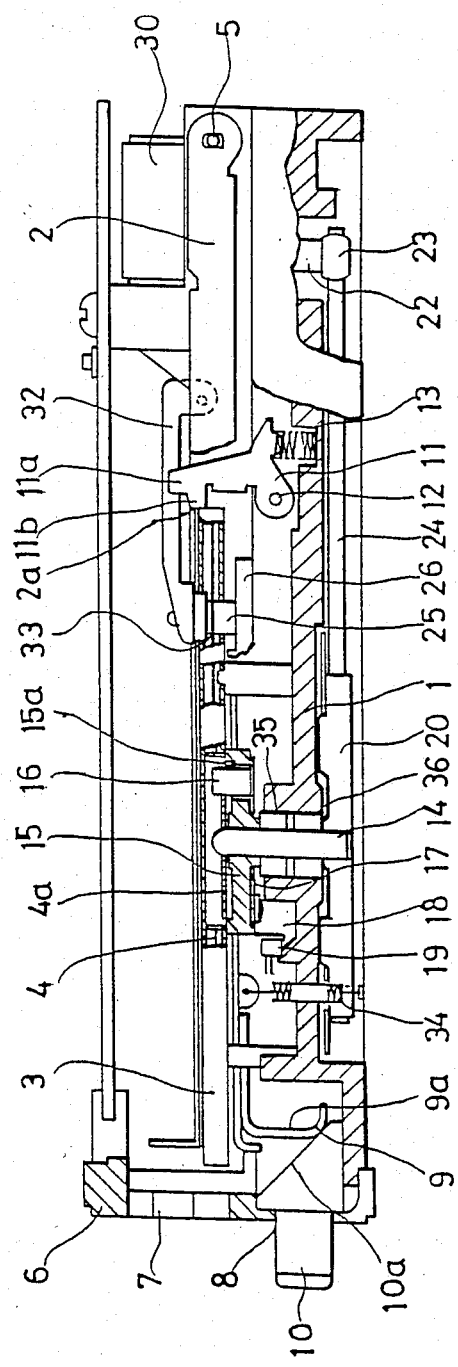

FIG_3
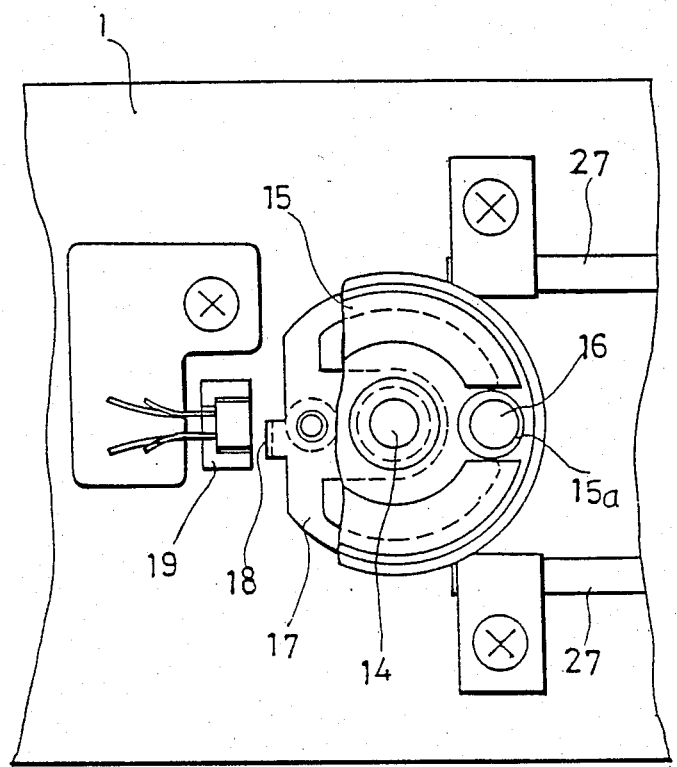
FIG_4
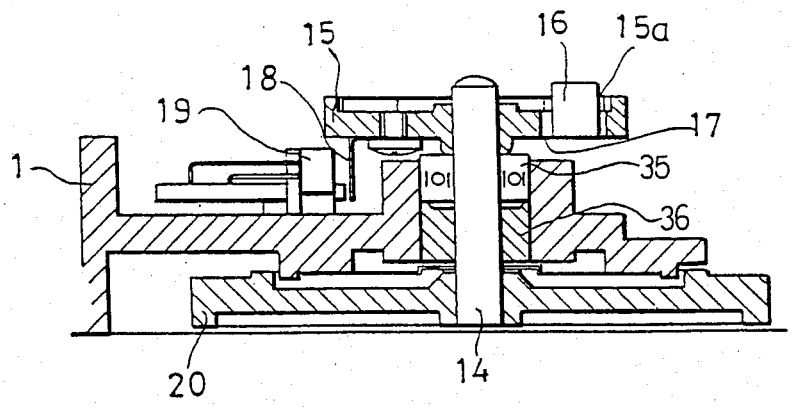

INDEX SIGNAL ISSUE MECHANISM OF A MAGNETIC RECORD AND REPRODUCTION DEVICE

FIELD OF THE INVENTION

This invention relates to an index signal issue mechanism of a magnetic record and reproduction device, including a photo sensor of a reflection type provided in opposition to a reflection plate extending toward spring which is secured on the lower surface of a spindle hub, and supports a driving pin disposed on the spindle hub which chucks and rotates a magnetic disc.

BACKGROUND OF THE INVENTION

In conventional floppy disc, an index signal indicates start and finish of a track, and this indication is carried out by optically detecting an index hole provided in a case.

A floppy disc of 3.5" has been recently developed and this is not provided with an index hole. Therefore an index signal issue mechanism should be independent. In a case of a direct drive, a rotor of a flat motor is utilized, and in a case of a belt drive, a pulley secured to the spindle is utilized, and the index signal issue mechanism is formed optically or magnetically.

In the above mentioned index signal issue mechanism, when the rotor or pulley is secured on the spindle it is necessary to perform their alignment with a driving pin projecting on a spindle hub, and engaging a drive hole of a metal hub in the center of the magnetic disc. This operation is very troublesome.

In view of these circumstances, the present invention is to provide an index signal issue mechanism of a magnetic record and reproduction device which does not require any adjustment when the mechanism is set up.

BRIEF DESCRIPTION OF THE DRAWINGS

FIG. 1 is a plan view of the invention;
FIG. 2 is a side view of the same; and
FIGS. 3 and 4 are views showing parts thereof.

THE MOST PREFERRED EMBODIMENT OF THE INVENTION

An outlined explanation will be made to the present device in reference to FIGS. 1 and 2. The numeral 1 designates a base which is, at its front face, secured with a bezel 6 having an opening 7 for a disc cassette 3 and is, at its rear part, pivoted on a bearing pin 5 with a carrier disc 2 by its back portion for detachably holding the disc cassette 3. The bearing pin 5 is arranged at a side of a standing of said base 1.

The carrier disc 2 is biased toward the base 1 by a tension spring 34 which is, at one end, held on the base. A cross member 9 projects on the lower surface at the front end portion of the carrier disc 2 and has an engaging cam face 9' which engages an oblique part 10' of an eject button 10. The latter is mounted in a hole 8 formed at the lower part of the bezel 6.

The numeral 11 designates a carrier support which is pivoted on a shaft 12 provided in the base 1, biased in the counterclockwise direction, and contacts a termination 2a of an upper plate of the carrier disc 2.

The numeral 14 is a spindle which is rotatably supported via a bearing 35 and a plane metal 36, and is secured with a spindle hub 15 and a pulley 20.

The numeral 16 is a driving pin which is slidably mounted in a hole 15' of the spindle hub 15, for engaging a driving hole formed in a central metal hub 4' of the magnetic disc 4. The driving pin 16 at its lower part is secured by a support spring 17 as a plate spring.

The support spring 17 of the driving pin 16 is firmly mounted on a boss at the lower surface of the spindle hub 15. A reflection plate 18 is formed by bending the support spring 17 downward, and extended thereto. A photo sensor 19 of a reflection type is disposed toward the reflection plate. Thus, an index signal issue mechanism is formed as mentioned herebefore, and shown in detail in FIGS. 3 and 4.

The numeral 21 is a motor secured on the base for driving the magnetic disc. A pulley 23 secured to the rotation shaft 22 of the motor and a pulley 20 secured to the spindle 14 are connected via a belt 24.

The numeral 25 is a magnetic head for record and/or reproduction of data to the magnetic disc 4, which is secured to a carriage 26 slidable along two guide rods 27 horizontal and parallel with respect to the base 1.

The numeral 33 is a pad secured at an end of a pad arm 32 which is pivoted to the carriage 26 and provided with the counterclockwise rotation, for keeping a desired contact between the magnetic head 25 and the magnetic disc 4 by pressure of the pad for carrying out the record and/or reproduction of the data.

The numeral 28 is a follower shaft attached to the carriage. Its end portion engages a lead screw 29 secured on a rotation shaft 31 of a stepping motor 30.

The floppy disc device of the present invention works as mentioned hereafter.

For carrying out the record and/or reproduction of the data to the magnetic disc, the disc cassette 3 is charged into the carrier disc 2 from the opening 7 of the bezel 6, the terminal part of the disc cassette 3 contacts an engaging part 11b of the carrier support 11, so that the carrier support 11 is rotated in the clockwise direction against the action of the spring 13, and releases the engagement of the engaging part 11a with the terminal part 2a of the carrier disc 2, the carrier disc 2 is rotated toward the base 1 by the action of the spring 34, and the disc cassette 3 is set into the determined condition.

Subsequently, when the magnetic disc 4 chucked by the spindle hub 15 is rotated at high speed by the driving motor 21 and the rotation shaft 31 of the stepping motor 30 is rotated angularly by an input signal, the lead screw 29 is also rotated, and the carriage 26 is reciprocated along the radial direction of the magnetic disc by the guiding shafts 27 via the follower shaft 28. The record and/or reproduction of the data is performed by the magnetic head 25 contacting the magnetic disc 4 exposed in the head window provided in the case.

For said performance, the index signal is accurately issued per each of the rotation of the magnetic disc by the rotation of the reflection plate 18 in accompany with the rotation of the spindle hub.

If the eject button 10 is pushed inside when the record and/or reproduction of the data is finished, the carrier disc 2 is rotated separately from the surface of the base against the action of the spring 34 due to the engagement between the oblique part 10' of the eject button 10 and the oblique face 9a of the cross member 9, the disc cassette is discharged, and the terminal part 2a of the carrier disc 2 is engaged with the engaging portion 11a of the carrier support 11. This condition is maintained for a subsequent operation.

As mentioned above, since the reflection plate composes the index signal issue mechanism and extends toward the driving pin support spring, the positioning precision of the reflection plate is determined by the precision of securing the driving pin support spring on the lower surface of the spindle hub. The support spring is attached to the spindle hub by inserting the driving pin secured at the end of the spring into the hole formed in the spindle hub, and mounting the hole in the center of the spring on the boss projected on the lower surface of the spindle hub. Therefore, such a positioning precision depends upon the processing precision and not upon the setting precision.

The setting-up does not require any adjustment or alignment for the index signal issue mechanism, and it may be made easy. In addition, the precision of said mechanism is heightened by heightening the processing precision of the parts.

What is claimed is:

1. An index signal issue mechanism of a magnetic record and reproducing device, comprising
   a magnetic disc;
   a spindle hub which chucks and rotates said magnetic disc and has a lower surface and a hole;
   a driving pin arranged on said spindle hub and extending through said hole of said spindle hub;
   a spring secured to said lower surface of said spindle hub and supporting said driving pin;
   a reflection plate integral with said spring and extending downwardly away from said lower surface of said hub; and
   a photo sensor arranged opposite to said reflection plate.

* * * * *